UNITED STATES PATENT OFFICE

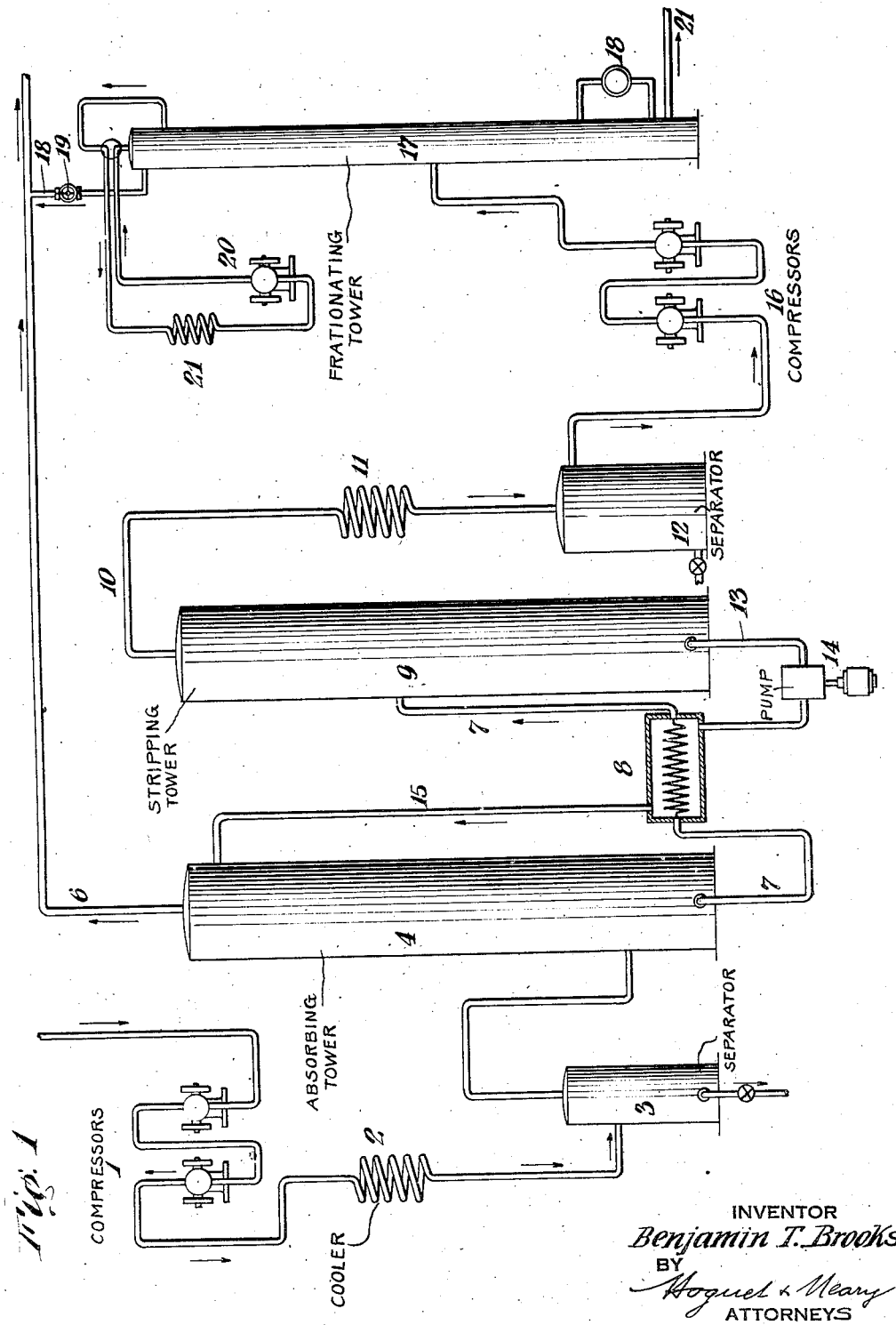

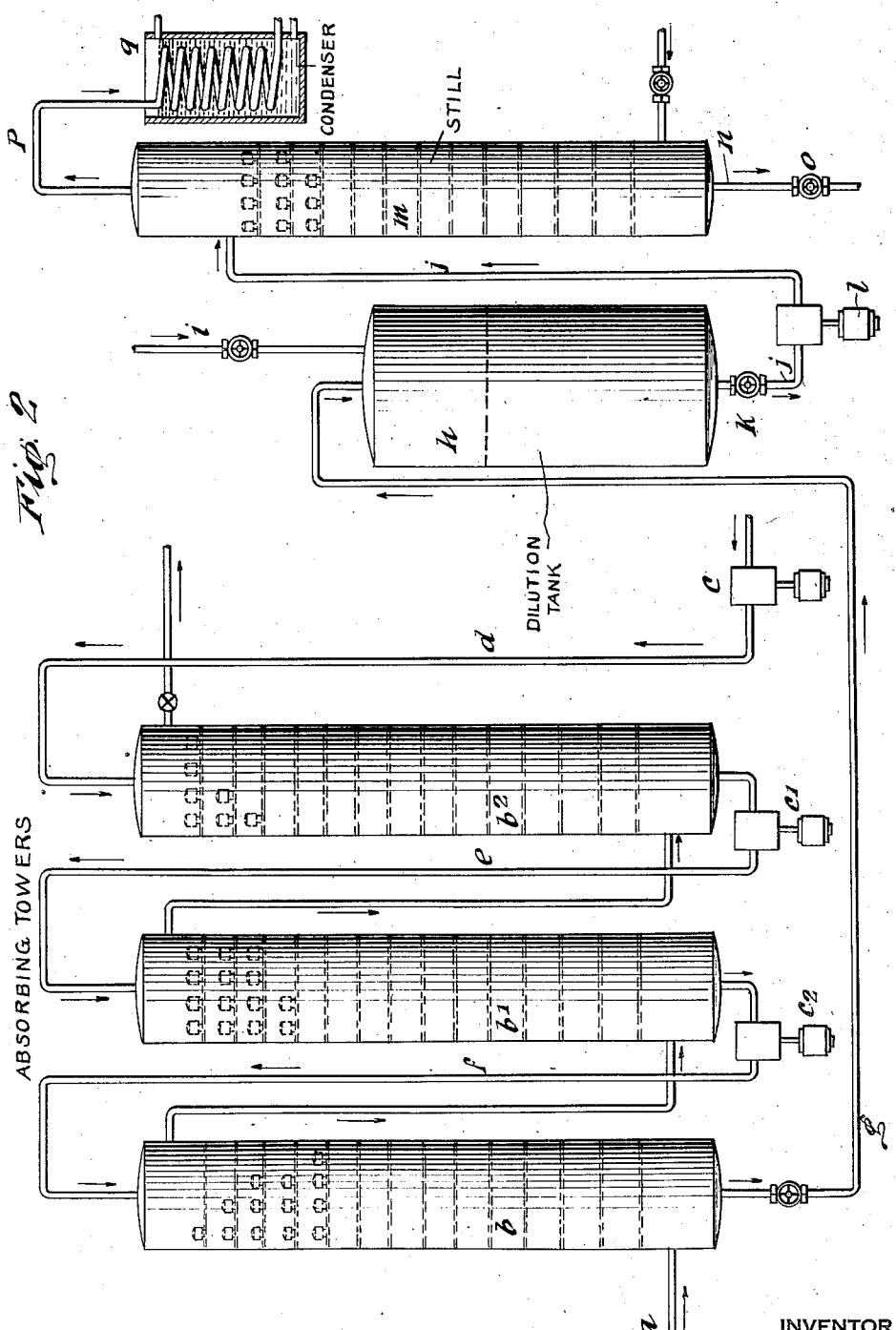

BENJAMIN T. BROOKS, OF GREENWICH, CONNECTICUT, ASSIGNOR, BY MESNE ASSIGNMENTS, TO STANDARD ALCOHOL COMPANY, OF WILMINGTON, DELAWARE, A CORPORATION OF DELAWARE

PROCESS OF MAKING ETHYL ALCOHOL

Application filed August 22, 1931. Serial No. 558,650.

This invention relates to the utilization for alcohol production of the ethylene in cracked hydrocarbon gases, and more particularly relates to the treatment of complex cracked hydrocarbon gas mixtures for the segregation of the ethylene free from other reactive constituents of the gas, followed by the treatment of the residual gas fraction containing ethylene and paraffin hydrocarbons by methods particularly adapted in view of the composition of such fraction to the conversion of the ethylene into its combinations with sulfuric acid. As will be more fully hereinafter set forth, the sequence of operations embodied in the present process results in a combination of advantages which it is not possible to realize when these several steps are not co-ordinated.

It has long been known that substantially pure ethylene is capable of reacting with hot concentrated sulfuric acid to form ethyl sulfuric acid together with more or less di-ethyl sulfate. However, in order to utilize successfully the ethylene present in cracked hydrocarbon gases, the other reactive unsaturated hydrocarbons or olefines in the gas must be removed before the reaction of the ethylene and sulfuric acid can be successfully carried out. Previous attempts to utilize the ethylene in such gases included the removal of the olefines which are more reactive than ethylene by scrubbing the gas with sulfuric acid of varying concentrations and temperatures followed by treating the residual gas with hot concentrated sulfuric acid. In this earlier procedure the sulfuric acid reaction mixture was then heated for the production of ethyl-ether.

I have discovered certain physical conditions for separating the more reactive constituents of the gas, such as the olefines higher than ethylene and the di-olefines, and thereby forming a residual gas fraction of a high degree of purity as regards freedom from said reactive constituents other than ethylene, so that the final products made from the ethylene are of a high degree of purity and entirely satisfactory for exacting commercial uses. I have also discovered conditions for the absorption of the ethylene by sulfuric acid which are much more rapid and efficient than the methods heretofore known, and which are particularly advantageous in the treatment of ethylene in the presence of large percentages of paraffin hydrocarbons.

One of the conditions which is utilized for the separation of the propylene, butylenes and other olefines from the ethylene, i. e. high pressure, is utilized in the next step in promoting the absorption of the ethylene by the acid, and after the ethylene has been absorbed the residual gas, which is still under pressure, is made to do work by expansion through a turbine, thus recovering in part the work done in compressing the original gas.

I have further found that certain readily available materials are particularly amenable to certain cracking treatments having as a result the production of gas mixtures especially suited as raw materials for carrying on the separating and absorption treatments above mentioned. While the invention in its broader aspects is not to be deemed as limited to the use of such materials and the application thereto of the certain cracking treatments, which are referred to more fully hereinafter, nevertheless the use of such materials and treatments is to be regarded as an advantageous feature of the invention.

The characteristic raw material of the present invention is cracked hydrocarbon gas resulting from the thermal decomposition of hydrocarbon oils, such as petroleum or fractions derived from petroleum. One class of oils derived from petroleum which is particularly suited to the manufacture of cracked hydrocarbon gas of a composition especially suited as a raw material for use in carrying out the present invention, is the type commonly known to the industry as gas oil, such as is commonly used for carburetting water gas. Another very suitable raw material is the fraction consisting largely of butane, isobutane and propane, which is commonly removed from the lighter grades of gasoline in the process of so-called stabilizing of the lighter grades of gasoline, and I find that this material can be decomposed by heat to give a gas very rich in ethylene, and that in this decomposition relatively less heavy tar and carbon or coke is formed than when heavier hydrocarbon oils are decomposed under the same conditions. The general temperature range within which the decomposition of the gas oil or other petroleum fractions is preferably carried out in order to obtain high yields of gas rich in ethylene is approximately 593 to 816° C. Pressures not exceeding about 30 pounds are recommended. When using gas oil for this purpose I preferably employ temperatures within the range 593 to 677° C., and when using the lighter fractions, somewhat higher temperatures are employed, as for example, I prefer temperatures within the range 704 to 816° C. when cracking the propane-butane fraction.

The cracking operation may be carried out in any suitable apparatus, but the preferred type of apparatus employed for this purpose is a tube furnace, the oil being passed through metal tubes of relatively small diameter so that the oil or oil vapors have a relatively high linear velocity and are quickly passed through the heating zone, thereby subjecting the oil vapors to the cracking temperature for a very short period. In this way the olefines are removed from the cracking zone almost as quickly as formed, thereby preventing further and undesirable reactions. The tubes employed for this purpose are preferably wrought iron or calorized steel, or may consist of alloys capable of withstanding the high temperatures employed. Furthermore, the tubes should preferably possess an internal diameter of 1 to 2 inches, although a somewhat larger or smaller diameter is permissible. In general high carbon steels or alloys containing nickel are somewhat objectionable since they promote the formation of carbon in the tubes. The length of the tubes should bear a certain relation to the internal diameter, and the oil or oil vapors should preferably be passed through a series of tubes in parallel rather than one long continuous coil or tube as more fully described in my copending application, Serial No. 594,525.

The cracked hydrocarbon gas leaving the cracking furnace is first passed through a tar scrubber and then passed through a suitable water cooled condenser where any readily liquefied fractions are condensed. The gas is then treated to separate the propylene and propane and higher boiling hydrocarbons on the one hand while leaving a residual gas containing substantially all of the ethylene.

The propylene, butylenes and other condensable hydrocarbons are sharply separated from the ethylene, methane and ethane either by compression to about 500 to 550 pounds together with cooling to about −12° C., or by compression to about 300 to 500 pounds in the presence of a moderately high boiling absorbent oil together with cooling to around 18–24° C. The exact choice of conditions for the separation of the propylene and higher condensable hydrocarbons from the ethylene and residual gas will vary somewhat according to local conditions and the composition of the gas. Thus when the gas produced is a comparatively rich gas containing approximately 35% methane, 24% ethylene, 10% ethane, 16% propylene, 2% propane, 7% butylenes and butane, and 6% of amylenes, pentane and condensable gasoline vapors, it will be sufficient to compress the gas to 300 pounds per square inch pressure in the presence of circulating absorption oil cooled to about 21° C. In general the last named pressure is the more economical so far as the separation of ethylene and residual gas from the propylene and other olefines is concerned. However, inasmuch as it is desirable to have the residual gas containing the ethylene under pressure to promote the reactions involved in the second step in the process, i. e., absorption in acid, it is sometimes advantageous, particularly if the gas is comparatively lean in ethylene, to operate the first or separation step of the process at around 500 pounds pressure. While this is somewhat more costly as far as the separation step is concerned, the higher pressure is particularly advantageous in the second or acid absorption step of the process.

When the separation includes the combination of oil absorption and compression as above stated, a part of the ethylene content of the gas and more or less of the ethane may and usually is absorbed in the oil absorbent, in which case the ethylene content so absorbed may be recovered in the form of a rich ethylene gas by suitable distillations, preferably carried on under high pressure conditions. The gas so recovered may be mixed with the ethylene gas mixture passing overhead from the absorber and then subjected to an acid absorption treatment, or may be treated separately, while still subjected to the pressure obtaining in the distillation step or to reduced pressure within the range of pressures recommended for the acid absorption.

The propylene, butylenes, amylenes, and other hydrocarbons separated from the ethylene may in turn be separated individually as for the production of alcohols or for other derivatives of these olefines respectively or otherwise utilized, as for example, the propylene and butylene may be separated from the higher boiling hydrocarbons and may be readily liquefied separately or together and utilized as liquefied fuel.

The residual gas, free from propylene, and other reactive olefines is thus obtained under a high pressure, which pressure is substantially the pressure used in the separation of the propylene and other olefines, and this residual gas containing the ethylene is then passed directly while still under such high pressure to the acid absorption system. This residual gas, when made under the cracking conditions described above, will contain at least 25% ethylene and usually from 30 to 36% ethylene. The residual gas containing the ethylene while still under pressure is intimately contacted with concentrated sulfuric acid at temperatures within the range 70 to 100° C., and preferably within the range 80 to 90° C. In general the gas containing the ethylene is passed in a countercurrent direction to the flow of the acid. This may be carried out in suitable scrubbing towers in which the maximum of surface contact between the acid and the gas is provided or the gas may be passed through a series of closed vessels in which the acid is sprayed through the gas. In whatever form of apparatus the contacting of the acid and gas takes place, the temperatures and pressures are maintained within the range already given. The absorption apparatus may be constructed of any material capable of resisting the action of the warm sulfuric acid, as for example, steel or acid resisting alloys. The preferred type of absorption apparatus is one or a series of towers provided with perforated plates, carrying bubble caps over the perforations of the general type widely used in the distillation art for fractional distillation. In this adaption of the bubble cap type of tower to the present purpose, the gas containing the ethylene, under pressure, is admitted as or near the bottom of the tower and passes upwardly through the tower, the gas being brought into intimate contact with the acid on each successive plate of the tower and finally issues from the top or near the top of the tower. A single tower may be constructed of sufficient height and with sufficient bubble cap plates to give nearly complete absorption of the ethylene at a given rate of flow, but a second similar tower and even a third tower, may be provided to be operated in series to make the absorption more complete or to take care of excessive amounts of gas as may happen when the rate of gas flow is for any reason abnormally high.

The acid concentration employed should be within the range 90 to 100 per cent $H_2SO_4$. In general when the higher concentrations of acid are employed, the temperature of the reaction is maintained at somewhat lower temperatures, namely 70 to 80° C., whereas when acid concentrations of 92 to 95 per cent $H_2SO_4$ are used, somewhat higher temperatures will be maintained in the absorption towers, namely 80 to 90° C. Due to the heat of reaction between the ethylene and the acid, it will usually not be necessary to pre-heat the gas before entering the absorption towers, although this may be advisable as for example, when the ethylene content of the gas is relatively low. The absorption towers may be provided with cooling coils in order to maintain the temperature of the acid within the desired range. The acid is supplied to the absorption towers by means of a suitable pump or acid egg, the rate of flow of the acid being regulated according to the quantity and richness of the gas, so that the flow of acid released from the bottom of the tower is sufficiently rich in ethyl sulfates to insure reasonable economy of operation.

While the continuous method of absorption substantially as described is the one preferred, it is, of course, possible without departing from the principles of the present invention, to treat successive batches of acid with the residual gas containing the ethylene. In this method one or more absorbers are charged with acid and the gas passed through the apparatus until the acid has become nearly saturated with ethyl sulfates when the process is discontinued and the gas passed into another absorber containing fresh acid. Two or more of such batch absorbers may be connected in series.

The residual gas from which the ethylene has been largely or entirely removed is then treated in order to make use of the pressure of this gas, as for example, it may be utilized to operate a pump to circulate the acid used in the process, or it may be passed through a suitable gas turbine to perform work and generate power which in part compensates for the work done on the original gas in compressing it. After being reduced in pressure this final residual gas may then be employed as a fuel, as for example, it may be used in the compressors employed for compressing the original gas in the first or separation step of the process, or it may be employed as a fuel for re-concentrating the acid used in the second step of the process or both.

The acid reaction mixture resulting from the reaction of the ethylene and the sulfuric acid is diluted with water so that the diluted mixture contains the equivalent of 25 to 45 per cent sulfuric acid calculated as $H_2SO_4$. The diluted acid reaction mixture is then hydrolized to give mainly sulfuric acid, ethyl alcohol, and a relatively small proportion of ethyl-ether. The hydrolysis of the acid product and the distillation of the products of hydrolysis, ethyl alcohol and ethyl-ether, may be carried out simultaneously as by a batch distillation in which the acid reaction mixture is heated to above 80° C. until the original ethyl sulfates are substantially completely hydrolized. Another suitable method of working up these acid reaction products is to hydrolize the diluted reaction mixture by heating to approximately 70–80° C. for several hours until the hydrolysis is substantially complete and then distilling the mixture either by a continuous or a batch method. In general three to six hours at 70 to 80° C. will complete the hydrolysis to a sufficient degree for distillation to be carried out without undue loss. In general the greater the dilution with water and the more slowly and carefully, namely, lower temperatures, the hydrolysis is carried out, the smaller will be the proportion of ethyl-ether produced. However, since ethyl-ether is an industrially important commodity, I usually prefer to produce a substantial proportion of it and also take advantage of the lessor dilution of the acid thereby resulting. I find that when the acid reaction mixture is diluted to about 40 percent sulfuric acid calculated as $H_2SO_4$, and the mixture distilled until hydrolysis is substantially complete, that the proportions of ethyl-ether to ethyl alcohol are about 15 to 85 per cent respectively.

The operation of the process will be more readily understood by reference to the accompanying drawings, in which:

Fig. I is a diagrammatic representation of an apparatus for carrying out the first or gas separation step of the process, and Fig. II is in part a diagrammatic representation of apparatus used in, and in part a flow sheet of, the second or absorption step and the third or hydrolyzing step of the process.

The cracked petroleum gas produced in a cracking furnace, not shown, and which gas has been cooled to condense readily condensable hydrocarbons, is then passed to compressors indicated at 1 (see Fig. I). After compression to about 300 pounds, the gas is cooled by a cooler diagrammatically represented at 2, and the condensed liquid separated in a separating trap 3, from which the gas passes as shown to the main absorber 4, where substantially all of the propylene, butylenes, amylenes and other condensable hydrocarbons are absorbed by a suitable absorbent oil, the residual gas passing out from the top of the absorber by the pipe 6. The absorbent oil, containing a portion of the ethylene and substantially all of the propylene and higher boiling hydrocarbons, is withdrawn from the main absorber 4 by the pipe 7 through a heat exchanger 8 to the still 9. The so-called fat oil or solution of propylene, butylenes, etc. in the absorbent oil is heated in the still 9 to liberate the ethylene, propylene, butylenes, amylenes and gasoline vapors which pass overhead by the pipe 10 through the cooler 11 to the separator or dryer 12 where water is removed. The absorption oil collecting in the bottom of the still 9 is passed by the pipe 13 and the pump 14 through the heat exchanger 8 and pipe 15 back to the main absorber 4. The gas mixture leaving the separator or dryer 12 is passed through the compressors 16 to a high pressure still 17 where that portion of the ethylene which is dissolved in the absorbent oil in the absorber 4, is separated from the propylene and higher boiler hydrocarbons. The ethylene so separated in the high pressure still 17 is passed out by the pipe 18 through a reducing valve 19 to the main residual gas line 6. The still 17 is heated by a heating apparatus or so-called reboiler 18, and the top of the column is cooled by a liquid mixture of propylene and ethylene containing also some propane and ethane, which liquid is obtained by compressing a portion of the gas at the top of the column by the compressor 19 and the cooler 20. A liquid mixture of propylene, butylenes, and other higher boiling hydrocarbons leaves the still 17 by the pipe 21.

In case it is desired to carry on the acid absorption step with the gas under higher pressures than would obtain in the line 6 under the conditions above mentioned, a compressor may be introduced into the line 6 between its junction with the pipe 18 and the offtake from 4. If this is done, the combined flow of gases may be led forward to the acid absorption system at a pressure only slightly below that of the gases coming from the high pressure still 17. If the gases coming over from the absorber 4 contain water, a separator or dryer should be inserted in front of the compressor introduced into the line 6.

The residual gas containing the ethylene leaves the gas separating system (Fig. I) by the pipe 6 and enters the acid absorption system (Fig. II) by the pipe $a$ near the bottom of the absorption tower $b$. The gas passes successively through the absorbing towers $b$, $b_1$ and $b_2$. Fresh sulfuric acid from the concentrators, not shown, is pumped by means of the pump $c$ and the pipe $d$ into the top of the absorber $b_2$ through which it flows downwardly and passes out by the pipe $e$ to the top of absorber $b_1$, through which it passes downwardly and out through the pipe $f$ to the top of the absorber $b$ through which it flows downwardly and out through the pipe $g$. Pumps $c_1$ and $c_2$ are provided for pumping the acid liquor from one to the other of the associated towers. The acid reaction mixture from the absorbing towers is conveyed by the pipe $g$ to the dilution tank $h$ where it is diluted with water, the water being introduced by the pipe $i$. After dilution the dilute acid mixture is withdrawn from the dilution tank $h$ through the pipe $j$ and the valve $k$ through the pump $l$ which pumps the dilute acid into the column still $m$ near the top of the same as shown. The absorbers $b$, $b_1$ and $b_2$ and the still $m$ are provided with perforated trays and bubble caps or other equivalent means for increasing the contact of gas and liquid in the case of the absorbers and in the case of the still $m$ for providing good contact with the ascending current of steam. The dilute sulfuric acid is removed from the still $m$ by means of the pipe $n$ and valve $o$, the dilute acid passing to the acid re-concentrator not shown. The alcohol vapors leave the still by the pipe $p$ and are condensed by a suitable condenser represented diagrammatically by the condenser $q$.

In a specific example, a commercial gas oil was cracked at 626.7° C. to give approximately 1200 cu. ft. of gas per barrel of gas oil, the other products being mainly gasoline and fuel oil residuum. The gas contained 34% methane and hydrogen (mainly methane), 25% ethylene, 10% ethane, 16% propylene, 2% propane, 7% butylenes and butane, and 6% of amylenes, pentane and gasoline hydrocarbons. By compression to 300 pounds per sq. inch and scrubbing the gas with absorption oil, collecting the residual unabsorbed gas and stripping the dissolved ethylene from the propylene, butylenes and other condensed hydrocarbons, and adding ethylene so obtained to the residual gas obtained in the absorption operation, a gas was obtained containing approximately 1% of propylene and 35% of ethylene, the balance consisting chiefly of methane and ethane. The gas contained accordingly approximately 27 pounds of ethylene per thousand cubic feet. The gas under pressure of about 300 pounds per sq. in. was passed through sulfuric acid, 93% $H_2SO_4$, at 85° C. For 1000 cu. ft. of this gas, this volume being expressed as the volume at atmospheric pressure and 15.6° C., there were used 115 pounds of sulfuric acid, 93% $H_2SO_4$. After treatment with the acid the residual gas contained 2.0% ethylene. The acid reaction mixture was diluted with water, using for 115 pounds of the original acid, 24 gallons of water. After thorough mixing of the acid reaction mixture and water, the mixture was slowly distilled in a lead lined still and a distillate containing ethyl-ether, ethyl alcohol and water was obtained, which on further purification by distillation yielded 5½ gallons of 95% alcohol and 6 pounds of ethyl-ether.

It should be pointed out that under the preferred conditions for separating the ethylene from propylene and other reactive olefines, that the residual gas containing the ethylene will normally contain from 1.0 to 1.5% propylene. This propylene under the conditions given for the second or acid absorption step of the process is converted partly to hydrocarbon polymers and partly to isopropyl alcohol, the presence of which in amounts up to 5% by volume in the final resulting ethyl alcohol, is not objectionable for most commercial uses. When, however, a pure ethyl alcohol is desired, it can readily be produced by the procedure given above of employing a series of absorption towers, the propylene being completely absorbed in the first absorbing tower leaving substantially propylene-free ethylene to be absorbed in the subsequent absorption towers. In this case the acid employed in the first or preliminary absorption tower is kept segregated from the acid used in the subsequent absorption towers, so that two grades of ethyl alcohol finally result, namely an impure grade containing a relatively small amount of isopropyl alcohol, and a second grade consisting of substantially pure ethyl alcohol containing the normal amount of water, namely approximately 5% by volume.

I claim:

1. The process of making ethyl alcohol from hydrocarbon material containing ethylene and other olefines, which comprises substantially completely separating ethylene from other reactive constituents of said material, by compressing said material under a pressure within the range 300 to 550 pounds per square inch to effect condensation of the said other reactive constituents and to form a residual ethylene-containing gas fraction, treating the ethylene-containing fraction while still under a pressure within the range stated with sulfuric acid while maintaining a temperature and an acid concentration at which sulfation of the ethylene takes place, diluting heating and hydrolyzing the sulfated mixture thus formed, and recovering the alcohol from the other products of hydrolysis.

2. The process of making ethyl alcohol from hydrocarbon material containing ethylene and other olefines, which comprises substantially completely separating ethylene from other reactive constituents of said material, by compressing said material under a pressure within the range 300 to 550 pounds per square inch to effect condensation of the said other reactive constituents, and to form a residual ethylene-containing gas fraction, treating the ethylene-containing fraction while still under a pressure within the range stated with sulfuric acid of 90–100% $H_2SO_4$ content at from 70 to 100° C. to effect sulfation of the ethylene, diluting and hydrolyzing the sulfated mixture thus formed, and recovering the alcohol from the other products of hydrolysis.

3. The process of making ethyl alcohol from cracked hydrocarbon material, which comprises compressing said material under a pressure of 500 to 550 pounds per square inch at around −12° C. to effect condensation of substantially all the propylene and the more easily condensable reactive constituents and to form a residual gas containing most of the ethylene, treating the ethylene-containing fraction while still under a pressure within the range stated with sulfuric acid of 90–100% $H_2SO_4$ content at from 70 to 100° C. to effect sulfation of the ethylene, diluting and hydrolyzing the sulfated mixture thus formed, and recovering the alcohol from the other products of hydrolysis.

4. The process of making ethyl alcohol from cracked hydrocarbon material, which comprises compressing said material under a pressure of from about 300 to 500 pounds per square inch, subjecting the compressed material to contact with an absorbent oil at a temperature of around 15–24° C. to absorb substantially all of the propylene and the more easily condensable reactive constituents and to form a residual gas fraction containing most of the ethylene treating the ethylene-containing fraction while still under a pressure within the range stated with sulfuric acid of 90–100% $H_2SO_4$ content at from 70 to 100° C. to effect sulfation of the ethylene, diluting and hydrolyzing the sulfated mixture thus formed, and recovering the alcohol from the other products of hydrolysis.

5. The process of making ethyl alcohol, which comprises contacting cracked hydrocarbon material containing about 25% or more of ethylene and substantially free of more reactive constituents, while in the gas phase and under a pressure within the range of about 300 to 550 pounds per square inch with sulfuric acid of from 90 to 100% $H_2SO_4$ content, while maintaining a temperature of from 70 to 100° C. to effect sulfation of the ethylene content, diluting and hydrolyzing the sulfated mixture thus formed, and recovering the alcohol from the other products of hydrolysis.

6. The process of making ethyl alcohol, which comprises contacting cracked hydrocarbon material containing about 25% or more of ethylene with the balance principally paraffin hydrocarbons and substantially free of more reactive constituents, while in the gas phase and under a pressure within the range of about 300 to 550 pounds per square inch with sulfuric acid of from 90 to 100% $H_2SO_4$ content, while maintaining a temperature of from 70 to 100° C. to effect sulfation of the ethylene content, diluting and hydrolyzing the sulfated mixture thus formed, and recovering the alcohol from the other products of hydrolysis.

7. The process of making ethyl alcohol, which comprises contacting cracked hydrocarbon material containing about 25% or more of ethylene with the balance principally ethane and methane and substantially free of more reactive constituents, while in the gas phase and under a pressure within the range of about 300 to 550 pounds per square inch with sulfuric acid of from 90 to 100% $H_2SO_4$ content, while maintaining a temperature of from 70 to 100° C. to effect sulfation of the ethylene content, diluting and hydrolyzing the sulfated mixture thus formed, and recovering the alcohol from the other products of hydrolysis.

8. The process of making ethyl alcohol, which comprises contacting cracked hydrocarbon material containing about 25% or more of ethylene and substantially free of more reactive constituents, while in the gas phase and under a pressure within the range of about 300 to 550 pounds per square inch with sulfuric acid of from 90 to 100% $H_2SO_4$ content, while maintaining a temperature of from 70 to 100° C. to effect sulfation of the ethylene content, diluting the acid reaction mixture with water so that the diluted mixture contains the equivalent of 25 to 40% sulfuric acid calculated as $H_2SO_4$, heating the dilute reaction mixture to effect hydrolysis and recovering the alcohol from the other products of hydrolysis.

9. The process of making ethyl alcohol, which comprises contacting cracked hydrocarbon material containing about 25% or more of ethylene and substantially free of more reactive constituents, while in the gas phase and under a pressure within the range of about 300 to 550 pounds per square inch with sulfuric acid of from 90 to 100% $H_2SO_4$ content, while maintaining a temperature of from 70 to 100° C. to effect sulfation of the ethylene content, diluting the acid reaction mixture with water so that the diluted mixture contains the equivalent of 25 to 40% sulfuric acid calculated as $H_2SO_4$, heating the dilute reaction mixture for from 3 to 6 hours at 70 to 80° C. to effect substantially complete hydrolysis, and then distilling the alcohol and recovering it separately from the other products of hydrolysis.

10. The process of making ethyl alcohol from hydrocarbon material containing ethylene and other olefines and paraffin hydrocarbons, which comprises forming an ethylene-containing fraction substantially free from other reactive constituents of said material by subjecting said material to strong compression and absorbing such other reactive constituents in an absorbent oil, treating the ethylene-containing fraction while still under substantially the same degree of compression with sulfuric acid while maintaining an acid concentration and a temperature at which sulfation of the ethylene takes place, diluting heating and hydrolyzing the sulfated mixture thus formed and recovering the alcohol from the other products of hydrolysis.

11. The process of making ethyl alcohol from hydrocarbon material containing principally ethylene and other olefines and paraffin hydrocarbons, which comprises compressing said material under a pressure of about 300 pounds per square inch and passing it while so compressed into absorbing relation with a liquid hydrocarbon to absorb substantially all of the reactive constituents other than ethylene and to form a residual ethylene-containing gas fraction substantially free from other olefines and reactive constituents, treating the ethylene-containing fraction while still under a pressure of around 300 pounds per square inch with sulfuric acid while maintaining an acid concentration and a temperature at which sulfation of the ethylene takes place, diluting heating and hydrolyzing the sulfated mixture thus formed and recovering the alcohol from the other products of hydrolysis.

BENJAMIN T. BROOKS.